Patented Oct. 17, 1939

2,176,630

UNITED STATES PATENT OFFICE 2,176,630

ALKYL SULPHONE DYESTUFFS OF THE ANTHRAQUINONE SERIES

David X. Klein, Silverside Heights, Del., assignor to E. I. du Pont de Nemours & Company, Wilmington, Del., a corporation of Delaware No Drawing. Application December 9, 1938, Serial No. 244,771

5 Claims. (Cl. 260—371)

This invention relates to the preparation of new dyestuffs of the anthraquinone series. The invention relates more particularly to the preparation of new anthraquinone acid wool dyestuffs which exhibit good leveling properties and dye in very desirable bright shades.

A large number of dyestuffs of the anthraquinone series have been prepared for the dyeing of animal fibers in which the sulphonic acid group which renders them water-soluble is attached directly to the anthraquinone nucleus or to an aryl radical attached through an amino group. The class of dyestuffs to which the present invention relates contains as the nucleus the 1-amino-2-anthraquinonesulphonic acid which carries an amino group in the 4-position that is substituted by an alkyl, aryl, aralkyl or cycloalkyl radical. Dyestuffs containing the nucleus as above described are well known in the prior art and the shades and dyeing characteristics of these compounds have been widely modified by the introduction of various substituents in the aryl radical connected to the amino group in the 4-position. The fastness of these dyestuffs and their level dyeing properties depend to a great extent upon the nature of the substituent present in the arylamino group in the 4-position. By altering the substituents in the phenyl ring, the shade of the dyestuff is often shifted materially so that further attempts have been made to introduce substituents in the opposite ring of the anthraquinone nucleus to which the arylamino group is attached, that is, in the 5, 6, 7 or 8-position to give products of similar shade with improved dyeing properties. By introducing a substituent, for example, in the 5-position of the anthraquinone nucleus which imparts to the dyestuff good level dyeing properties, one is then able to obtain a variety of shades by substituting in the 4-amino group any of the alkyl, aryl, aralkyl, or cycloalkyl radicals disclosed in the prior art.

It has been found that, by the introduction of an alkyl sulphone radical of the class consisting of ethyl sulphone and methyl sulphone in the 5-position of the anthraquinone nucleus, dyestuffs of this series can be prepared which exhibit good level dyeing properties, and which dye in greener and brighter shades than the corresponding dyestuffs which do not contain this alkyl sulphone radical and which exhibit good fastness to light and to fulling.

These dyestuffs are prepared from 1-amino-5-halogen-2-anthraquinonesulphonic acids by reacting the same with the alkyl mercaptan in the presence of sodium hydroxide and then oxidizing the mercaptan to the alkyl sulphone. The resulting sulphone compound is then brominated to introduce bromine in the 4-position, and then condensed with alkyl, aryl, aralkyl or cycloalkyl amine which may be further substituted. The following examples are given to illustrate the invention. The parts used are by weight.

Example 1

24.5 parts of 1-amino-4-bromo-5-ethyl sulphone-2-anthraquinonesulphonic acid sodium salt, 14 parts of aniline, 17 parts of sodium bicarbonate and 0.5 part of copper acetate are thoroughly mixed in 360 parts of water, and heated under agitation with reflux at 75° C. for 8 hours. The reaction mass is then cooled and filtered, and the filter cake is washed with 300 parts of a 2% sodium chloride solution. The filter cake is then dissolved in 800 parts of water and boiled in the presence of 5 parts of animal charcoal and then filtered. The filtrate is then adjusted to 1000 parts and salted at the boil with 50 parts of sodium chloride. Boiling is continued for ½ hour or until the precipitated color appears in well defined green needles (when viewed under the microscope). The suspension is then cooled and filtered and the filter cake is washed with 500 parts of a 2% sodium chloride solution and dried. The 1-amino-4-anilido-5-ethyl sulphone-2-anthraquinonesulphonic acid obtained dyes wool in attractive bright greenish blue shades. The product exhibits good level dyeing properties and fastness to light and fulling. The 1-amino-4-bromo-5-methyl sulphone-2-anthraquinonesulphonic acid sodium salt may be used in the above reaction to give a product which exhibits similar dyeing properties.

Example 2

By the substitution in the above example of an equal molecular quantity of p-chloroaniline, a dyestuffs is obtained which dyes wool in bright blue shades of good fastness and leveling properties.

Example 3

11 parts of 1-amino-4-bromo-5-ethyl sulphone-2-anthraquinonesulphonic acid, 9 parts of p-amino acetanilide, 6 parts of sodium bicarbonate, 0.14 part of verdigris and 120 parts of water are heated with reflux at 75–80° C. for 8 hours. The product is then worked up as in Example 1. The resulting 1-amino-4-(p-acetylaminophenyl)amino-5-ethyl sulphone-2-anthraquinonesulphonic acid sodium salt dyes wool in much greener and brighter shades than the corresponding dyestuff which does not contain the 5-ethyl sulphone radical, and is superior to that dyestuff in light fastness. It exhibits good level dyeing and fulling properties.

By the substitution of p-toluidine, meta-toluidine or p-phenetidine for the arylamines mentioned in the above examples, corresponding 5-alkyl sulphone derivatives are obtained which dye wool in bright blue to blue green shades of good fastness and level dyeing properties. Any other amines which have heretofore been condensed with bromamine acid (1-amino-4-bromo-2-anthraquinonesulphonic acid) may be condensed with applicant's new intermediate carrying the alkyl sulphone radical in the 5-position to give dyestuffs which dye is desirable bright shades and exhibit good level dyeing properties. As examples of the amines which may be substituted in the 4-position may be mentioned: methylamine or other alkyl amines, cyclohexylamine, bornyl amine, p-amino methyl acetanilide, p-amino formyl acetanilide, p-amino diphenyl, benzidine, a-naphthylamine, tetrahydro naphthylamines, p-amino diphenylamine, etc.

These dyestuffs may be employed for dyeing as the free acids or their alkali metal and ammonium salts.

The 1-amino-4-bromo-5-alkyl-sulphone-2-anthraquinonesulphonic acids may be obtained, for example, as follows:

298 parts of 1-amino-5-chloro-2-anthraquinonesulphonic acid sodium salt, 57.5 parts of ethyl mercaptan (94%), 40 parts of sodium hydroxide and 3500 parts of water are heated in an autoclave at 98–102° C. for approximately 20 hours. The mass is then cooled to room temperature, boiled with 20 parts of charcoal, filtered and the filtrate is salted to a 2% potassium chloride solution. It is then stirred until cool and filtered. The filter cake is washed with a small amount of water and then dried.

38.7 parts of the 1-amino-5-ethyl mercapto-2-anthraquinonesulphonic acid potassium salt as thus obtained, 500 parts of cold water and 32 parts of 27% hydrogen peroxide are heated to 60° C. for 8 hours. The partly soluble slurry becomes a deep clear red solution. It is then cooled to 20–25° C. and 25 parts of 78% sulphuric acid are added. 65 parts of a solution containing 6.71 parts of sodium bromide and 4.92 parts of sodium bromate are then slowly added. The mass is agitated until the 1-amino-4-bromo-5-alkyl sulphone-2-anthraquinonesulphonic acid is precipitated. The solution may be clarified by adding 10 parts of charcoal, heating to the boil for approximately 15 minutes and filtering off the small quantity of insoluble material. The filtrate is then made to approximately 1000 parts and 23 parts of soda ash are added to completely neutralize the solution. It is then cooled and the product is filtered off in the form of pink needles, washed with a small amount of water and dried.

The corresponding 5-methyl sulphone compound may be prepared in a similar manner by substituting methyl mercaptan for the ethyl mercaptan used in the specific example. The bromination of the 1-amino-5-alkyl sulphone-2-anthraquinonesulphonic acid may be carried out by any of the processes which are employed in the preparation of 1-amino-4-bromo-2-anthraquinonesulphonic acid.

The oxidation and bromination may be carried out simultaneously by using a larger amount of bromine. Care should be taken, however, that dibromination is not effected. In this case the 1-amino-4-bromo-5-alkylsulphoxide-2-anthraquinonesulphonic acid is apparently produced, which, however, after condensation with the amine is converted to the identical dyestuff obtained in the preceding examples by oxidation with air, such as by boiling.

I claim:

1. The 1-amino-5-alkyl sulphone-2-anthraquinonesulphonic acids and their alkali salts which carry in the 4-position a substituted amino radical of the class consisting of alkylamino, arylamino, aralkylamino and cycloamino radicals, the alkyl sulphone radical being of the class consisting of methyl sulphone and ethyl sulphone radicals, which dye animal fibers in bright level shades.

2. The 1-amino-4-arylamino-5-alkyl sulphone-2-anthraquinonesulphonic acids and their alkali salts in which the alkyl sulphone group is of the class consisting of methyl sulphone and ethyl sulphone radicals, and the arylamino group is one of the benzene series, which compounds dye animal fibers in bright level shades.

3. 1-amino-4-anilino-5-ethyl sulphone-2-anthraquinonesulphonic acid alkali metal salt.

4. 1-amino-4-p-chloroanilino-5-ethyl sulphone-2-anthraquinonesulphonic acid alkali metal salt.

5. 1-amino-4-p-aminoacetanilino-5-ethyl sulphone-2-anthraquinonesulphonic acid alkali metal salt.

DAVID X. KLEIN.